(12) United States Patent
Bircann et al.

(10) Patent No.: US 6,213,447 B1
(45) Date of Patent: Apr. 10, 2001

(54) POPPET VALUE HAVING A COMPLIANT SHAFT GUIDE AND COMPLIANT VALVE HEAD

(75) Inventors: Raul Armando Bircann, Penfield; Dwight Orman Palmer, Rochester, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/364,184

(22) Filed: Jul. 29, 1999

(51) Int. Cl.$^7$ ........................................ F16K 1/48
(52) U.S. Cl. ................................. 251/86; 251/84
(58) Field of Search ......................... 251/86, 84

(56) References Cited

U.S. PATENT DOCUMENTS

| | | |
|---|---|---|
| 33,246 | 9/1861 | Franklin . |
| 3,963,211 | * 6/1976 | Myers .................................... 251/86 |
| 4,235,416 | * 11/1980 | LaCoste et al. ........................ 251/86 |
| 4,431,160 | * 2/1984 | Burt et al. .............................. 251/86 |
| 4,565,217 | 1/1986 | McIntye . |
| 4,647,011 | * 3/1987 | Contzen et al. ................. 251/129.15 |
| 4,907,741 | 3/1990 | McIntyre . |
| 4,915,134 | 4/1990 | Toliusis et al. . |
| 5,211,198 | 5/1993 | Tinholt . |
| 5,467,962 | 11/1995 | Bircann et al. . |
| 5,676,345 | * 10/1997 | Zurke et al. ..................... 251/129.15 |
| 5,899,232 | 5/1999 | Cardoso et al. . |

\* cited by examiner

Primary Examiner—John Fox
(74) Attorney, Agent, or Firm—John A. VanOphem (57) ABSTRACT

A poppet valve wherein centering of the valve stem and head and mating of the valve head to the valve seat are compliantly directed by contact with the valve seat. The poppet valve employs an integral radially-floating valve stem sealing guide or bearing in the valve body, permitting lateral compliant movement of the valve stem as required. The guide also is configured to form a face seal against the valve body, thus permitting the face seal and a valve actuator solenoid to be biased by separate, independent springs, each of which may be optimized for its particular function. Further, the valve head is tiltably and sealably disposed upon the valve stem to permit the valve head to be guided and oriented into the valve seat by contact with the seat itself.

11 Claims, 7 Drawing Sheets

POPPET VALUE HAVING A COMPLIANT SHAFT GUIDE AND COMPLIANT VALVE HEAD

TECHNICAL FIELD

The present invention relates to poppet valves, more particularly, to poppet valves wherein the pintle shaft and the valve head are compliantly centered by contact with the valve seat, and most particularly, to a three-way configuration of such a poppet valve having a single pintle shaft.

BACKGROUND OF THE INVENTION

Poppet valves are widely used for opening and closing flow paths for gases and liquids, for example, as shift diverter valves in vehicles; for channeling hydrogen into reformers in fuel cells; and as intake, exhaust, and exhaust gas recirculation valves in internal combustion engines. A poppet valve comprises a typically circular valve head mounted transversely on a pintle shaft for axial motion thereof to form or eliminate a flow gap between the valve head and a mating circular valve seat in a valve base. A pintle shaft is also known as a valve shaft or valve stem.

Poppet valves can be very demanding in their design and fabrication tolerances. For example, some poppet valves are provided with conical mating surfaces on the valve head and valve seat; however, leak-free sealing over the entire mating surfaces depends on near-perfect circularity and smoothness of both surfaces. In addition, the surfaces must have substantially identical cone angles. The highest quality valves are ground on a precision lathe and then the valve head is lap-ground to its dedicated seat. This is labor-intensive, time-consuming, and expensive. U.S. Pat. No. 4,565,217 discloses a poppet valve having a conical head and a curved seat such that the head and seat can seal along a circular line of contact, thereby obviating the need for matching cone angles.

A further requirement for leak-free sealing is concentricity of the head and valve. Typically, concentricity is provided by the precision placement of a valve shaft guide on the co-axis of the valve head and valve seat, as disclosed, for example, in U.S. Pat. Nos. 4,565,217 and 4,907,741. Control of concentricity may be further enhanced by providing a second shaft guide opposite the first, such that the valve head is guided on both sides; see, for example, U.S. Pat. Nos. 4,915,134; 5,211,198; 5,899,232; and Re.33,246. Such precision guiding of a poppet valve shaft can be costly and cumbersome to provide, and expensive to maintain, particularly in poppet valves wherein the diameters of the valve and seat are large relative to the diameter of the shaft or stem.

A problem with shaft guides generally is that clearance between the guide and the shaft represents a potential source of leakage from the valve. U.S. Pat. No. 5,467,962, the disclosure of which is incorporated herein by reference ('962), discloses an actuator housing having a linear bearing (valve guide) which is operable both to align the valve stem within the valve base and to define a seal between the base and the housing. The clearance required between the solenoid armature and the armature shell prevents precise alignment thereby of the valve stem in the valve body. Therefore, a small radial clearance is provided between the bearing and the actuator housing, preferably about 0.2 mm, which allows some limited side-to-side or radial movement of the valve and stem, permitting compliant centering of the valve stem and head by contact with the valve seat. This also permits an extremely close tolerance between the valve stem and the bearing, enhancing shaft sealing thereby. A face seal between the bearing member and the actuator housing prevents leakage around the bearing member. Thus, sealing between the bearing and the housing is maintained regardless of radial movement of the bearing in the housing or the position of the valve stem within the bearing. A shortcoming of the disclosed apparatus is that a single coil spring, disposed on axis between the bearing and the solenoid armature, functions both to bias the face seal and to return the armature upon deactivation of the solenoid. The spring must be sufficiently strong to ensure the bearing face seal, but the stronger the spring, the greater the force the solenoid must overcome in closing the valve. In general, a single spring cannot be optimized for both functions.

Further, known poppet valves require that the valve head be mounted perfectly orthogonal to the valve stem and that a plane containing the valve seat be perfectly parallel to a plane containing the valve head. Any significant deviation in any one of these relationships can cause the head to mate imperfectly with the seat, which can result in valve leakage.

SUMMARY OF THE INVENTION

The present invention is directed to an improved poppet valve wherein the centering of the valve stem and head and the mating of the valve head to the seat are directed by, and compliant to, the actual orientation of the valve seat. The poppet valve disclosed herein addresses the indicated shortcomings of known poppet valves in two novel ways.

First, the valve employs an integral valve stem sealing guide or bearing configured to also form a face seal, similar to the sealing guide in the actuator discussed supra. In the present invention, however, the bearing is disposed in the valve base rather than in the actuator, permitting the face seal and the actuator solenoid to be biased by separate, independent springs, each of which may thus be optimized for its particular function.

Second, the valve head is not rigidly mounted to the valve stem but rather is tiltably and sealably disposed thereupon to permit the valve head to be guided and oriented into the valve seat by contact with the seat itself.

BRIEF DESCRIPTION OF THE DRAWINGS

The foregoing and other objects, features, and advantages of the invention, as well as presently preferred embodiments thereof, will become more apparent from a reading of the following description, in connection with the accompanying drawings in which.

DESCRIPTION OF THE PREFERRED EMBODIMENT

Figure 1:
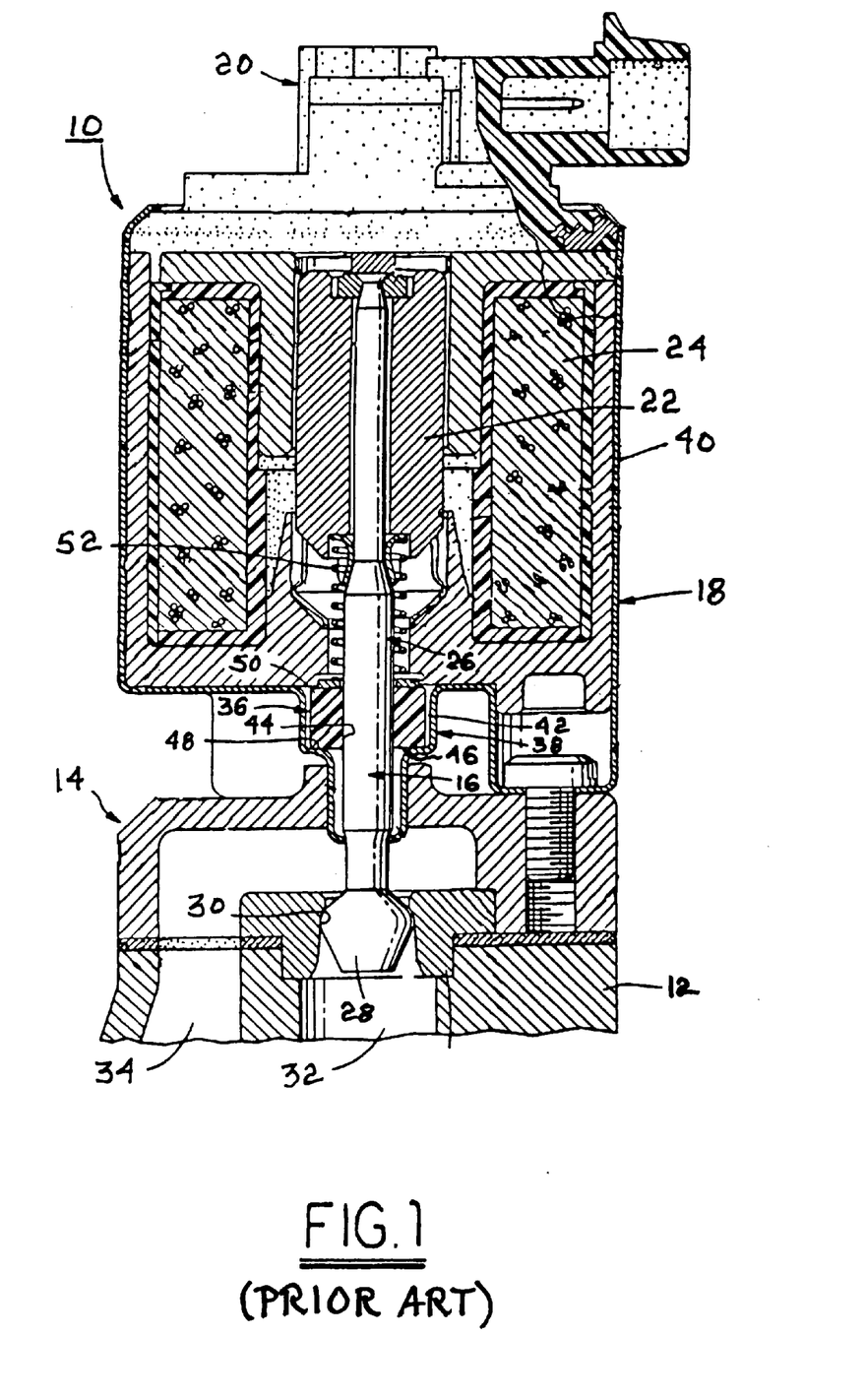
FIG. 1 is an elevational cross-sectional view of a prior art poppet valve.

Referring to FIG. 1, a prior art two-way poppet valve 10 for use as an exhaust gas recirculation (EGR) valve for an engine 12, substantially as disclosed in the incorporated '962 reference, includes four principal subassemblies: a valve base assembly 14, a valve assembly 16, an actuator assembly 18, and a valve position sensor 20.

Actuator assembly 18 includes solenoid armature 22 which is responsive conventionally to a magnetic field exertable by electromagnet coil 24 to axially drive valve stem 26 supporting valve head 28 to open or close a gap between valve head 28 and valve seat 30, thereby regulating flow of gas between engine exhaust passage 32 and engine intake passage 34.

A valve stem bearing or guide 36 is received in stepped extension 38 of actuator housing 40. Guide 36 is not fixed in radial position but is free to float, to a limited extent, utilizing clearance 42 to allow radial movement of the valve stem 26 occurring as a result of factors such as actuator variabilities, machining imperfections, or operation-caused wear. The side-to-side, or radial, movement facilitated by the floating bearing allows the interface between the axial bearing bore 44 and valve stem 26 to be of an extremely close tolerance, virtually eliminating gas leakage along valve stem 26 into actuator assembly 18.

In addition to the sealing interface established between the valve stem 26 and bearing 36, a face seal is defined between the lower surface 46 of bearing member 36 and an upper surface 48 of housing extension 38. A biasing force is exerted on the upper surface 50 of bearing 36 by a spring 52 inserted and operable between bearing member 36 and solenoid armature 22. Spring 52 thus biases armature 22 and valve assembly 14 toward the closed position and also exerts axial force on bearing member 36 to ensure the face seal of lower surface 48 against housing extension 38.

Figure 2:
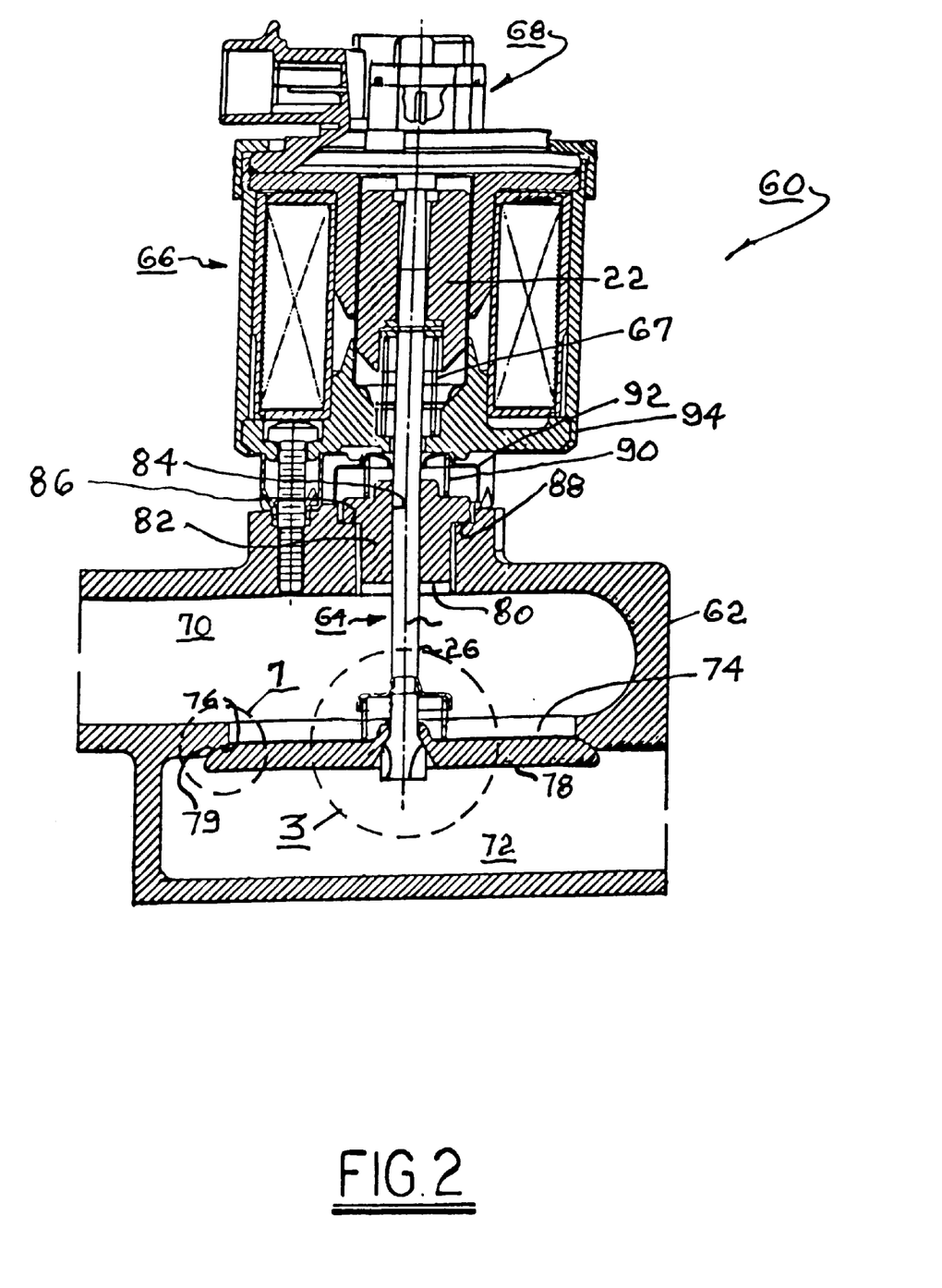
FIG. 2 is an elevational cross-sectional view of a twoway poppet valve and actuator in accordance with the present invention.

Referring to FIG. 2, a two-way poppet valve 60 in accordance with the invention is provided with a valve base assembly 62, a valve assembly 64, an actuator assembly 66, and a valve position sensor 68.

Figure 7A:
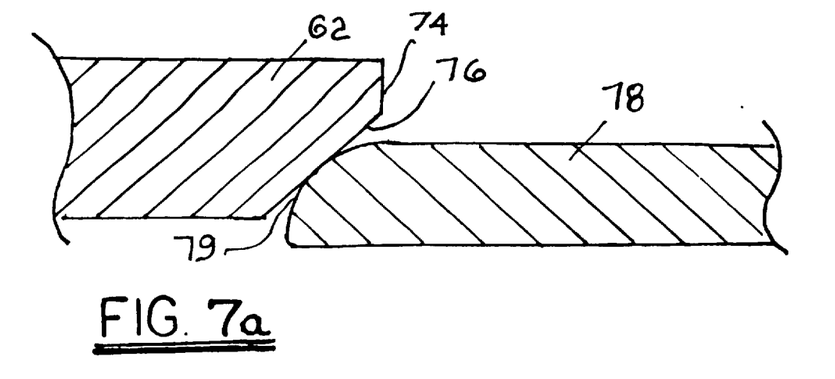
FIGS. 7a, 7b, and 7c are detailed cross-sectional views showing three different embodiments of valve seat and valve head sealing surface combinations.
Figure 7B:
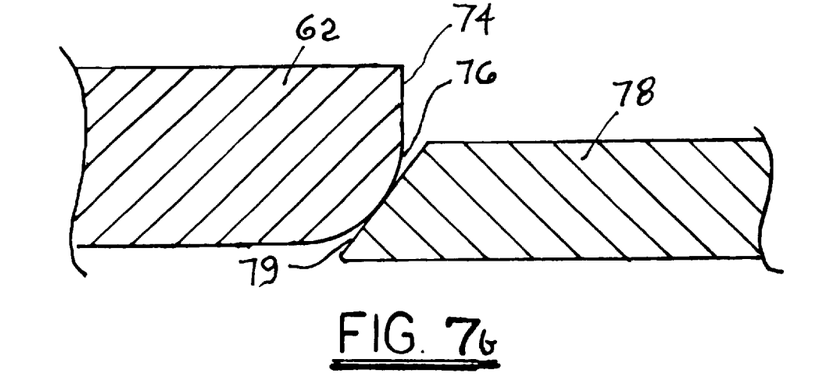
Figure 7C:
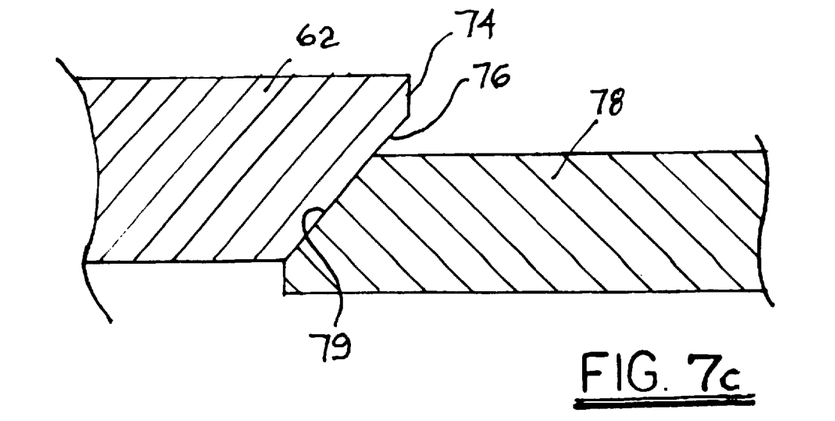

Valve base assembly 62 comprises first and second chambers 70,72 which may be intake or exhaust chambers, respectively, as shown in FIG. 1 or the reverse. Between chambers 70,72 is port 74 which is preferably circular in plan view (not shown). Port 74 is provided with a valve seat 76 at an edge thereof, which seat may be conical as shown in FIGS. 7a and 7c or curved as shown in FIG. 7b, for sealingly receiving a matable valve head 78 having a reciprocally curved or conical sealing periphery 79 as shown in FIGS. 7a and 7b, respectively, or both valve head and seat may be provided with mating conical surfaces as shown in FIG. 7c. Preferably, curved or radiused mating surfaces on valve seats and valve heads are spherical sections.

Valve base assembly 62 further comprises an opening 80 substantially coaxial with port 74 for receiving a valve stem bearing 82 functionally similar to bearing 36 in FIG. 1. Opening 80 is greater in diameter than bearing 82, preferably by about 0.2 mm, such that bearing 82 may float side-to-side, or radially, in opening 80. Axial bore 84 in bearing 82 is sealingly receivable of valve stem 26, which is captured and operated by actuator assembly 66 substantially as disclosed in the '962 reference. Opening 80 is stepped to provide a planar shoulder 86, functionally corresponding to upper surface 48, and bearing 82 is provided with a flange having a lower surface 88 corresponding to lower surface 46. Lower surface 88 is urged against planar shoulder 86 to form a face seal by biasing spring 90. Spring 90 is centered and retained by retainer 92 which is captured between valve base 62 and housing 94 of actuator assembly 66. Thus, the valve stem bearing may be spring-sealed to whatever force is desired without regard to the action of the actuator, in distinction from the prior art valve 10. The action of solenoid armature 22 is modulated by a separate spring 67 disposed within the actuator assembly and independent of seal spring 90.

Figure 3:
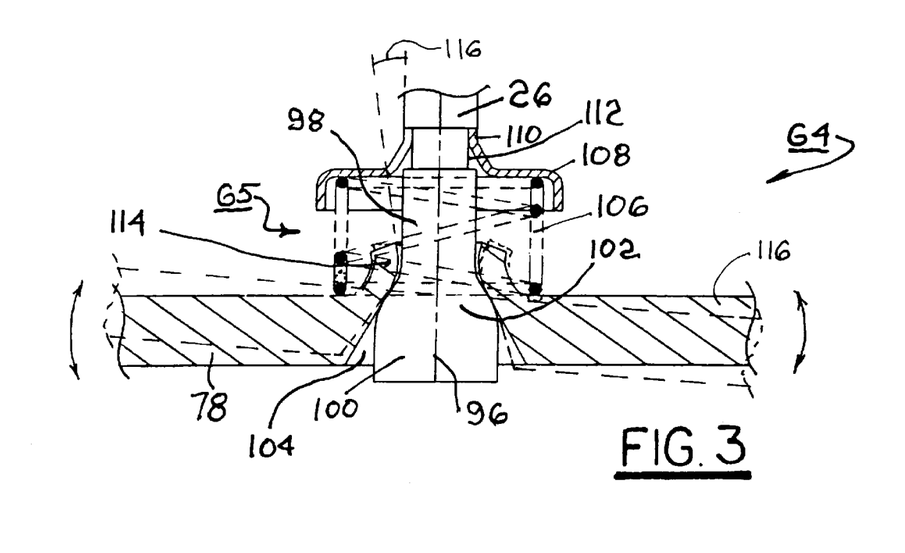
FIG. 3 is a detailed view of the compliant mechanism in the poppet valve shown in in FIG. 2.

Referring to FIG. 3, valve assembly 64 includes a compliant mechanism 65 for allowing limited angular departure of the plane including valve head 78 from orthogonality to the axis 96 of valve stem 26 to accommodate any small departures from orthogonality of the plane containing the valve seat 76 and from the approximate valve head centering provided by solenoid armature 22.

Specifically, stem 26 is provided with a smaller diameter portion 98 and a larger diameter portion 100, the transition zone 102 therebetween defining a surface for sealing against a preferably conical central opening 104 in valve head 78. The transition zone must include a curved portion such that zone 102 and opening 104 sealingly mate in a continuous line contact therebetween. Preferably, the curved portion is spherical so that the line contact is circular at any angle of tilt of the valve head with respect to the valve stem.

Valve head 78 is urged against transition zone 102 by compression spring 106 which is captured by spring retainer 108, itself being captured axially on stem 26 by insertion of neck 110 into circumferential groove 112.

Opening 104 is further provided with a flange 114 which is flared outwards from stem portion 98 at a predetermined angle 116, preferably about 5° or less, corresponding to the maximum angle of tilt allowable for the plane of valve head 78 from stem axis 96.

Figure 8:
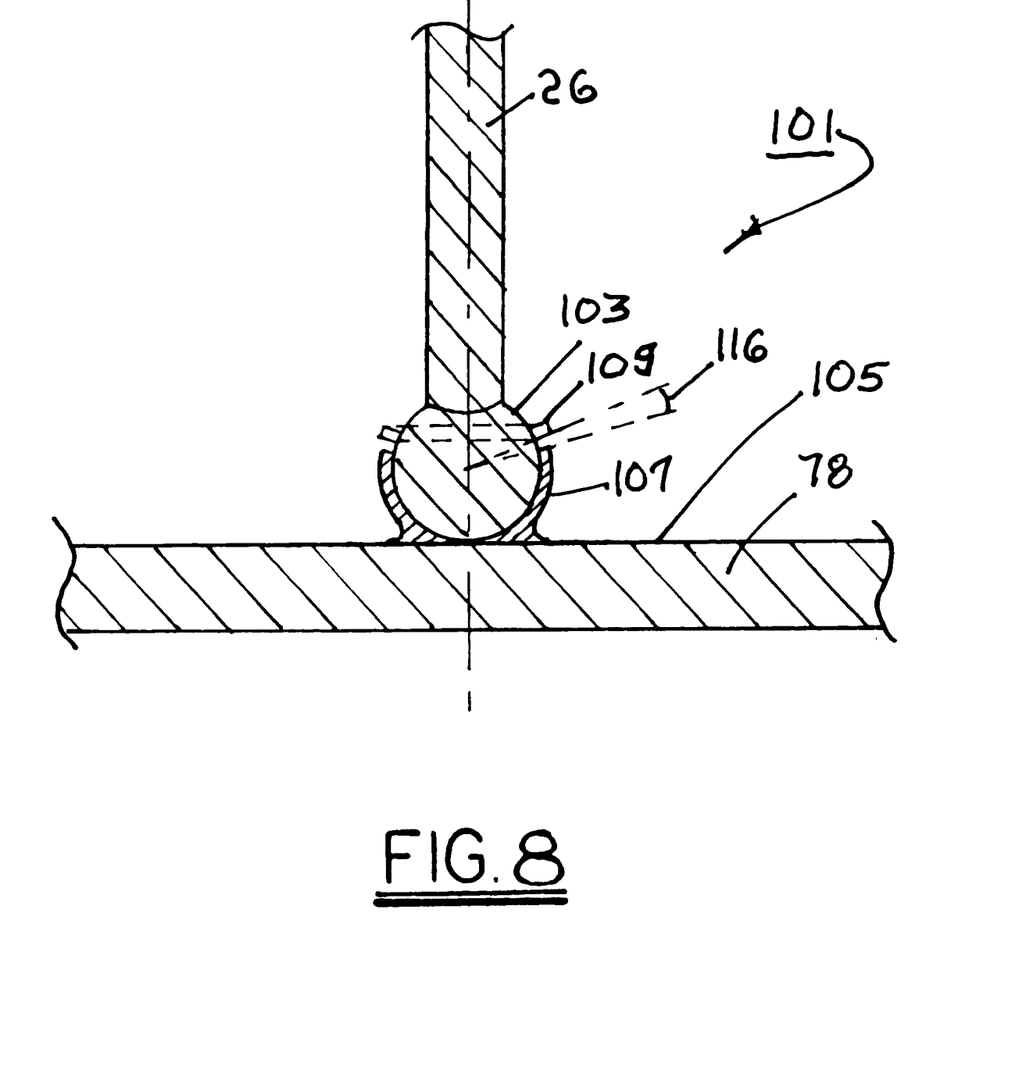
FIG. 8 is a cross-sectional view of an alternative embodiment of a compliant mechanism similar to that shown in FIG. 3.

An embodiment 101 of an angularly compliant valve head mechanism alternative to mechanism 65 is shown in FIG. 8. Stem 26 is provided with a ball end 103, and the upper surface 105 of valve head 78 is provided with a matable spherical socket 107 to form a conventional ball-and-socket joint with ball end 103. An annular stop 109 on ball end 103 limits the permissible angle of tilt 116. Of course, central opening 104 and flange 114 are omitted from this embodiment.

In operation to move from a valve-open state to a valve-closed state, actuator assembly 66 drives valve stem 26 axially to engage valve head 78 with valve seat 76. The stroke of solenoid armature 22 is limited by formation of a circular line of contact between head 78 and seat 76. Such line of contact may lie in a plane not quite orthogonal to the axis 96 of stem 26, and may not be quite concentric with axis 96. The herein-disclosed compliant mechanism permits the valve seat to direct the valve head concentrically into itself at the urging of the valve stem, via the radial compliance of the stem bearing 82 in opening 80 and the angular compliance of valve head 78 on valve stem 26.

Figure 4:
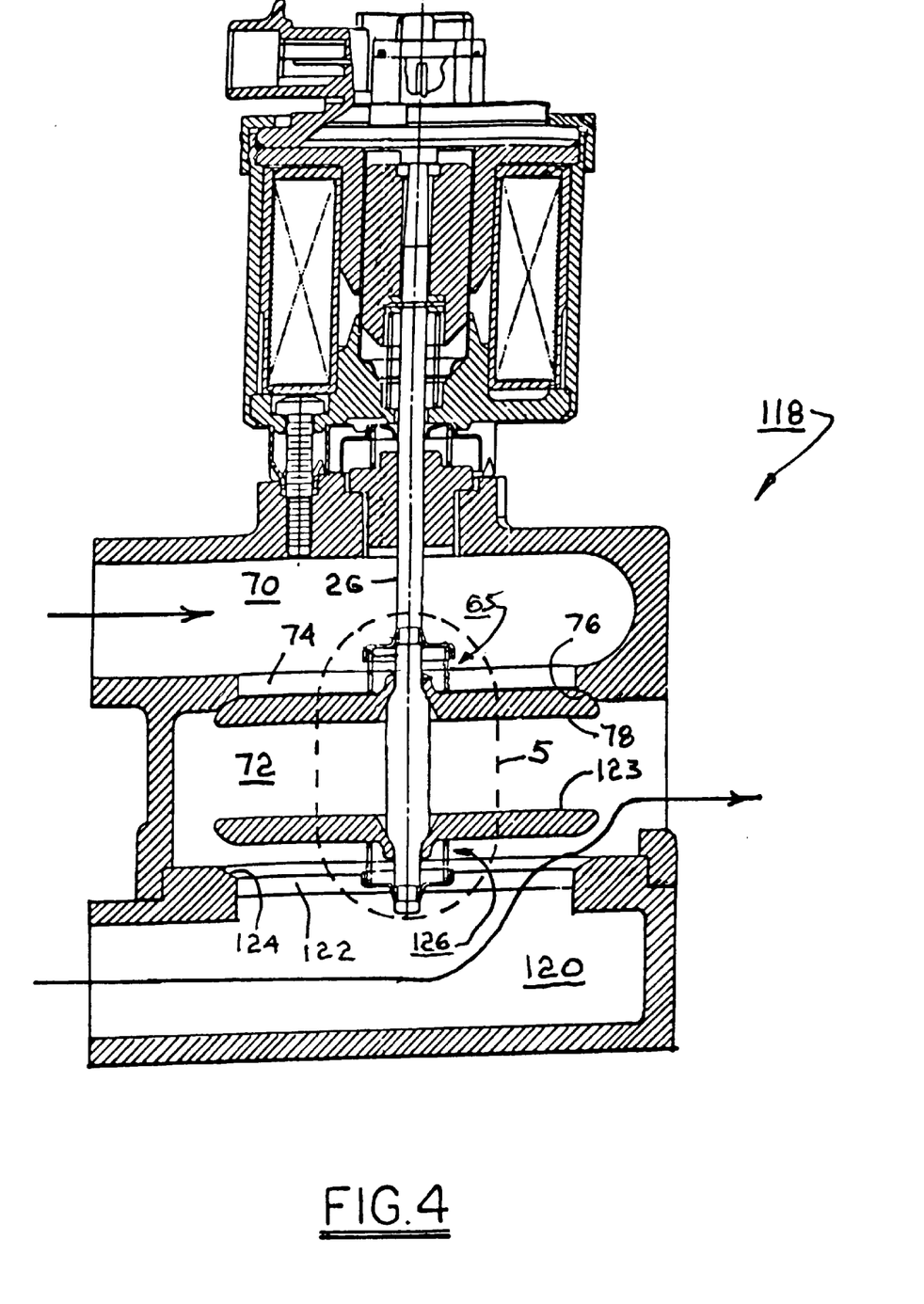
FIG. 4 is an elevational cross-sectional view of a first embodiment of a three-way poppet valve in accordance with the present invention.
Figure 5:
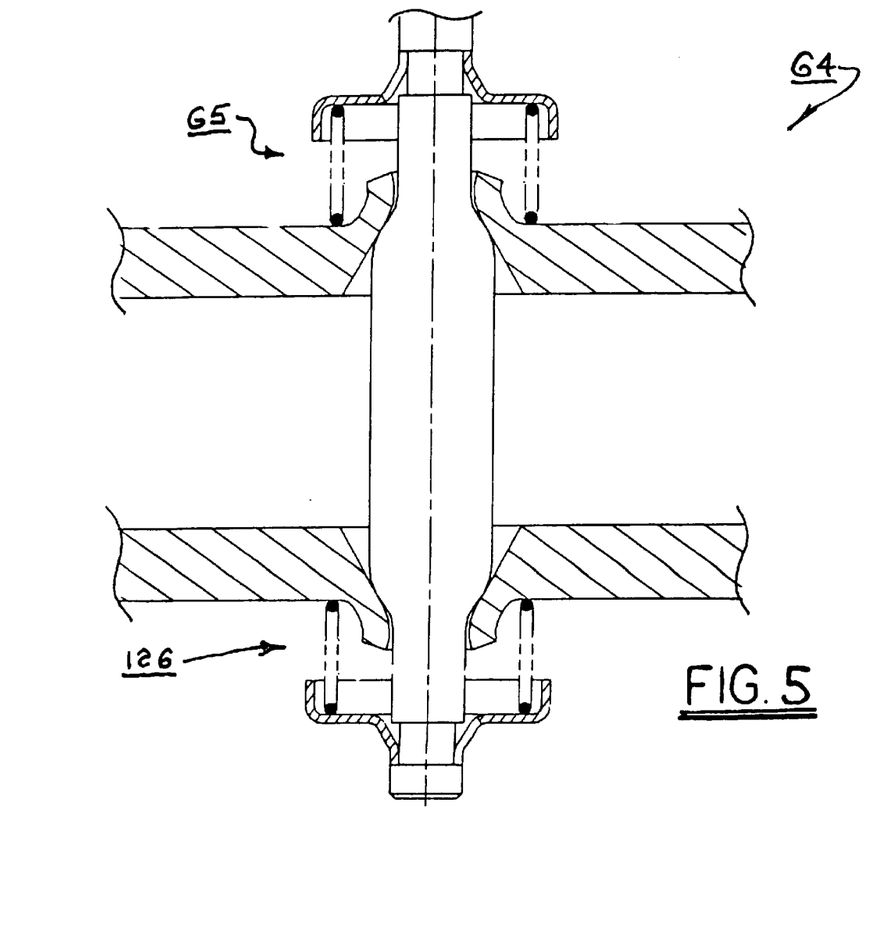
FIG. 5 is a detailed view like that shown in FIG. 3 with reference to the valve shown in FIG. 4.
Figure 6:
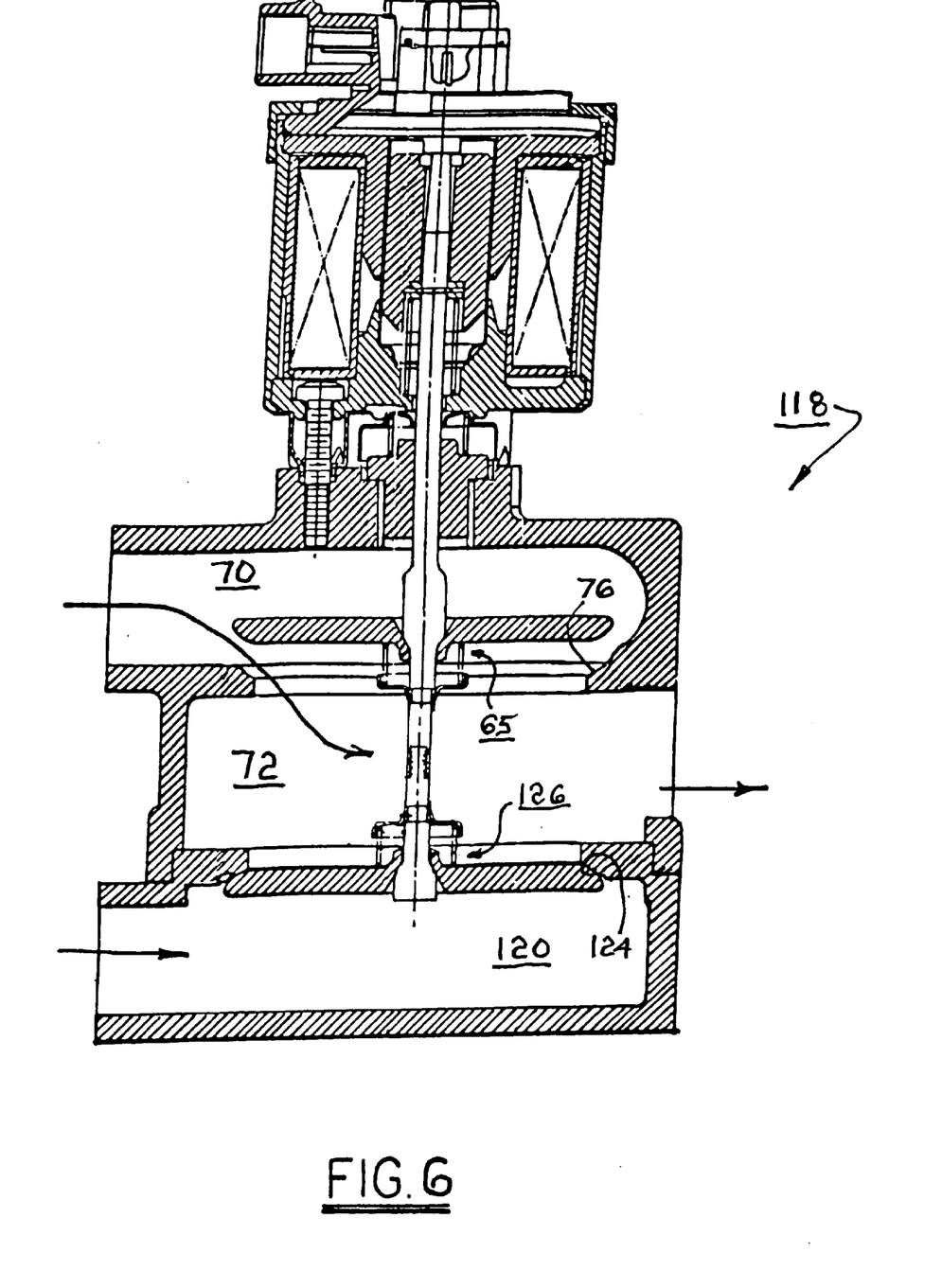
FIG. 6 is a view like that shown in FIG. 4, showing a second embodiment of a three-way poppet valve in accordance with the invention.

Other valve configurations are possible. For example, referring to FIGS. 4 and 6, a three-way poppet valve 118 may be useful in alternating two flow paths into a common flow path, or providing rationed flows into or out of a common flow path. Valve 118 is similar to two-way valve 60 but with a second valve comprising a third chamber 120 defining a second independent chamber in communication with chamber 72 via a second port 122 provided with a second valve seat 124 similar to seat 76, chamber 72 thereby being commonly accessible to both first chamber 70 and third chamber 120. Valve assembly 64 is extended to comprise a second compliant head mechanism 126 substantially identical to mechanism 65 just described (or to mechanism 101) but in inverse orientation such that when the first valve is fully closed, the second valve is fully open, as shown in FIG. 4. Valve seats 76 and 124 may both face into chamber 72, and compliant mechanisms 65 and 126 may both be disposed substantially in chamber 72, as shown in FIG. 4; or valve seats 76 and 124 may face into chambers 70 and 120, respectively, and compliant mechanisms 65 and 126 may be disposed substantially in chambers 70 and 120, respectively, as shown in FIG. 6.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A compliant poppet valve for modulating the flow of a gas or liquid comprising:

a) a valve body having a first chamber and a second chamber, and a port having a valve seat therebetween;

b) a valve stem extending into at least one of said first and second chambers;
        wherein said valve stem has a transition zone having a transition surface between a first diameter portion and a second diameter portion of said valve stem;

c) a radially-compliant valve stem bearing supported by said valve body and having a central bore for radially supporting said valve stem;
        wherein said radially-compliant valve stem bearing is disposed in an opening in said valve body, said opening having an inner diameter greater than the outer diameter of said bearing;
        wherein said radially-compliant valve stem bearing and said valve body are provided with axial mating surfaces urged together by a first spring for forming a face seal therebetween; and d) a moveable angularly-compliant valve head tiltably disposed by a second spring on said valve stem within one of said first and second chambers;
        wherein said valve head has a central opening therethrough having a central opening surface for receiving said transition surface to seal said opening while permitting tilting of said valve head relative to said valve stem.

2. A compliant poppet valve in accordance with claim 1 wherein said valve seat has a conical surface and said valve head has a curved surface for sealingly mating with said conical surface.

3. A compliant poppet valve in accordance with claim 2 wherein said curved surface is a spherical section.

4. A compliant poppet valve in accordance with claim 1 wherein said valve seat has a curved surface and said valve head has a conical surface for sealingly mating with said curved surface.

5. A compliant poppet valve in accordance with claim 4 wherein said curved surface is a spherical section.

6. A compliant poppet valve in accordance with claim 1 wherein said valve seat has a conical surface and said valve head has a conical surface for sealingly mating with said conical seat surface.

7. A compliant poppet valve in accordance with claim 1 wherein said valve stem is connected to said valve head by a ball-and-socket joint.

8. A compliant poppet valve in accordance with claim 1 wherein said transition surface is curved and said central opening surface is conical.

9. A compliant poppet valve in accordance with claim 8 wherein said curved transition surface is a spherical section.

10. A compliant poppet valve in accordance with claim 1 further comprising a flared flange projecting from said central opening for limiting the angle of tilt allowable for the plane of said tiltably disposed valve head from said valve stem.

11. A compliant poppet valve in accordance with claim 10 wherein said allowable angle of tilt is about 5°.

* * * * *